(12) United States Patent
Dunjic et al.

(10) Patent No.: US 11,593,012 B1
(45) Date of Patent: Feb. 28, 2023

(54) PARTIAL PASS-THROUGH DATA TRANSFER SYSTEM

(71) Applicant: The Toronto-Dominion Bank, Toronto (CA)

(72) Inventors: Milos Dunjic, Oakville (CA); David Samuel Tax, Toronto (CA); Jonathan Joseph Prendergast, West Chester, PA (US); Kushank Rastogi, Toronto (CA); Vipul Kishore Lalka, Oakville (CA); Asad Joheb, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/410,061

(22) Filed: Aug. 24, 2021

(51) Int. Cl.
*G06F 3/06* (2006.01)
(52) U.S. Cl.
CPC .......... *G06F 3/0646* (2013.01); *G06F 3/0604* (2013.01); *G06F 3/0631* (2013.01); *G06F 3/0635* (2013.01); *G06F 3/0665* (2013.01); *G06F 3/0683* (2013.01)
(58) Field of Classification Search
CPC .... G06F 3/0646; G06F 3/0647; G06F 3/0631; G06F 3/0635; G06F 3/0665; G06F 3/0683
USPC ................................................. 711/159, 165
See application file for complete search history.

(56) References Cited

U.S. PATENT DOCUMENTS

| | | | |
|---|---|---|---|
| 7,797,195 B2 | 9/2010 | Langhammer | |
| 8,875,990 B2 | 11/2014 | Bishop et al. | |
| 9,135,116 B1 * | 9/2015 | Balasubramanian | ... G06F 3/061 |
| 10,108,938 B1 * | 10/2018 | Brock | G06Q 20/3674 |
| 10,475,007 B2 | 11/2019 | Miyamoto et al. | |
| 10,783,576 B1 * | 9/2020 | Van Os | G06Q 20/3278 |
| 2002/0069166 A1 | 6/2002 | Moreau et al. | |
| 2010/0010906 A1 | 1/2010 | Grecia | |
| 2011/0258686 A1 * | 10/2011 | Raj | G06Q 20/10 |
| | | | 726/6 |
| 2012/0095873 A1 | 4/2012 | Narang et al. | |

(Continued)

OTHER PUBLICATIONS

J.Kinsey: "Electronic Technology: New Opportunities and New Demands for Retail Food Stores", Published in Journal of Food Distribution Research; pp. 50-55; https://ageconsearch.umn.edu/record/27432/files/31010050.pdf; publication date Mar. 1, 2000.

*Primary Examiner* — Than Nguyen
(74) *Attorney, Agent, or Firm* — Rowand LLP

(57) ABSTRACT

Methods and systems for performing a partial pass-through transfer are described. In an aspect, a method includes: receiving, from a first computing system, pass-through transfer definition data to be associated with a first logical storage area, the pass-through transfer definition data including a trigger condition for a pass-through transfer and an apportionment value for the pass-through transfer; storing a representation of the pass-through transfer definition data in association with the first logical storage area; detecting a first data transfer to the first logical storage area, the first data transfer representing a transfer of a resource; determining that the first data transfer satisfies the trigger condition; and in response to determining that the first data transfer satisfies the trigger condition: identifying a portion of the resource based on the apportionment value; and initiating a second data transfer.

20 Claims, 6 Drawing Sheets

| Trigger Condition 602 | Apportionment Value 604 | Outgoing Routing Data 606 | Outgoing Transfer Metadata 608 |
|---|---|---|---|
| Transferor=ABC Ltd | 20 | Acct no. 1234 Server ID 3576 | SKU = 12368 |
| Metadata includes SKU 547856 | 15 | Acct no. 788 Server ID 76 | none |

(56) References Cited

U.S. PATENT DOCUMENTS

| | | | |
|---|---|---|---|
| 2017/0337912 A1* | 11/2017 | Caligor | H04N 21/4341 |
| 2020/0286051 A1* | 9/2020 | Kade | G06Q 20/10 |
| 2020/0334671 A1 | 10/2020 | Davies et al. | |
| 2021/0103621 A1* | 4/2021 | Sarir | G06F 16/951 |
| 2022/0094697 A1* | 3/2022 | Alexander | G06Q 20/3223 |

* cited by examiner

| Trigger Condition 602 | Apportionment Value 604 | Outgoing Routing Data 606 | Outgoing Transfer Metadata 608 |
|---|---|---|---|
| Transferor=ABC Ltd | 20 | Acct no. 1234 Server ID 3576 | SKU = 12368 |
| Metadata includes SKU 547856 | 15 | Acct no. 788 Server ID 76 | none |

PARTIAL PASS-THROUGH DATA TRANSFER SYSTEM

TECHNICAL FIELD

The present application relates to data transfers and, more particularly, to systems and methods for processing an incoming transfer to automatically re-route a portion of the data transfer.

BACKGROUND

It is sometimes necessary or desirable to conduct transfers between database records. For example, transfers are sometimes made from a first record to a second record. The transfers may sometimes occur within the same database and sometimes the transfers may occur between different databases. In some instances, the databases may reside on different systems which may connect to one another through a network.

In some instances, it may be that a received transfer, or a portion thereof, is to be re-routed. Existing transfer systems often result in a high latency before such re-routing. In some instances, the re-routing may occur hours or even days after the initial transfer is received.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In accordance with another aspect of the present invention, there is provided a computer-implemented method. The method may include: receiving, from a first computing system, pass-through transfer definition data to be associated with a first logical storage area, the pass-through transfer definition data including a trigger condition for a pass-through transfer and an apportionment value for the pass-through transfer; storing a representation of the pass-through transfer definition data in association with the first logical storage area; detecting a first data transfer to the first logical storage area, the first data transfer representing a transfer of a resource; determining that the first data transfer satisfies the trigger condition; and in response to determining that the first data transfer satisfies the trigger condition, perform the pass-through transfer by: identifying a portion of the resource based on the apportionment value; and initiating the pass-through transfer, the pass-through transfer transferring the identified portion of the resource to a second logical storage area.

In some implementations, the method may further include: receiving a reversal request for reversing the first data transfer; in response to receiving the reversal request, sending a request to transfer to the second logical storage area, the request to transfer configured to reverse the pass-through transfer by sending a third data transfer from the second logical storage area to the first logical storage area; and detecting the third data transfer; and in response to detecting the third data transfer, initiating a fourth data transfer, the fourth data transfer reversing the first data transfer.

In some implementations, the first data transfer may include metadata. Determining that the first data transfer satisfies the trigger condition may include determining that the first data transfer satisfies the trigger condition based on the metadata.

In some implementations, the metadata may include a product identifier. Determining that the first data transfer satisfies the trigger condition based on the metadata may include determining that the first data transfer satisfies the trigger condition based on the product identifier.

In some implementations, the pass-through transfer may include metadata for evaluating whether a second trigger condition for a further pass-through transfer is to be performed.

In some implementations, the pass-through transfer may be transferred over a real time transfer rail such that the second logical storage area receives the identified portion in real time after the first data transfer is detected.

In some implementations, the apportionment value may define how a transfer of resources is to be apportioned in relative terms.

In some implementations, the apportionment value defines how a transfer of resources is to be apportioned in absolute terms.

In some implementations, the pass-through transfer definition data may include an identifier. Initiating the pass-through transfer may include: retrieving the identifier and including the identifier as metadata in the pass-through transfer.

In some implementations, the identifier may uniquely identify an entity that is associated with the first logical storage area in a system that is associated with an entity that is associated with the second logical storage area.

In accordance with one aspect of the present invention, there is provided a computing system that includes a processor and a communications module coupled to the processor. The computer system further includes a memory coupled to the processor. The memory may store instructions that, when executed, configure the processor to perform a method described herein. For example, the instructions may configure the processor to: receive, from a first computing system and via the communications module, pass-through transfer definition data to be associated with a first logical storage area, the pass-through transfer definition data including a trigger condition for a pass-through transfer and an apportionment value for the pass-through transfer; store a representation of the pass-through transfer definition data in association with the first logical storage area; detect a first data transfer to the first logical storage area, the first data transfer representing a transfer of a resource; determine that the first data transfer satisfies the trigger condition; and in response to determining that the first data transfer satisfies the trigger condition, perform the pass-through transfer by: identify a portion of the resource based on the apportionment value; and initiate the pass-through transfer, the pass-through transfer transferring the identified portion of the resource to a second logical storage area.

In accordance with another aspect of the present invention, there is provided a non-transitory computer-readable storage medium storing instructions that when executed by a processor of a computing system cause the computing system to perform a method described herein.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
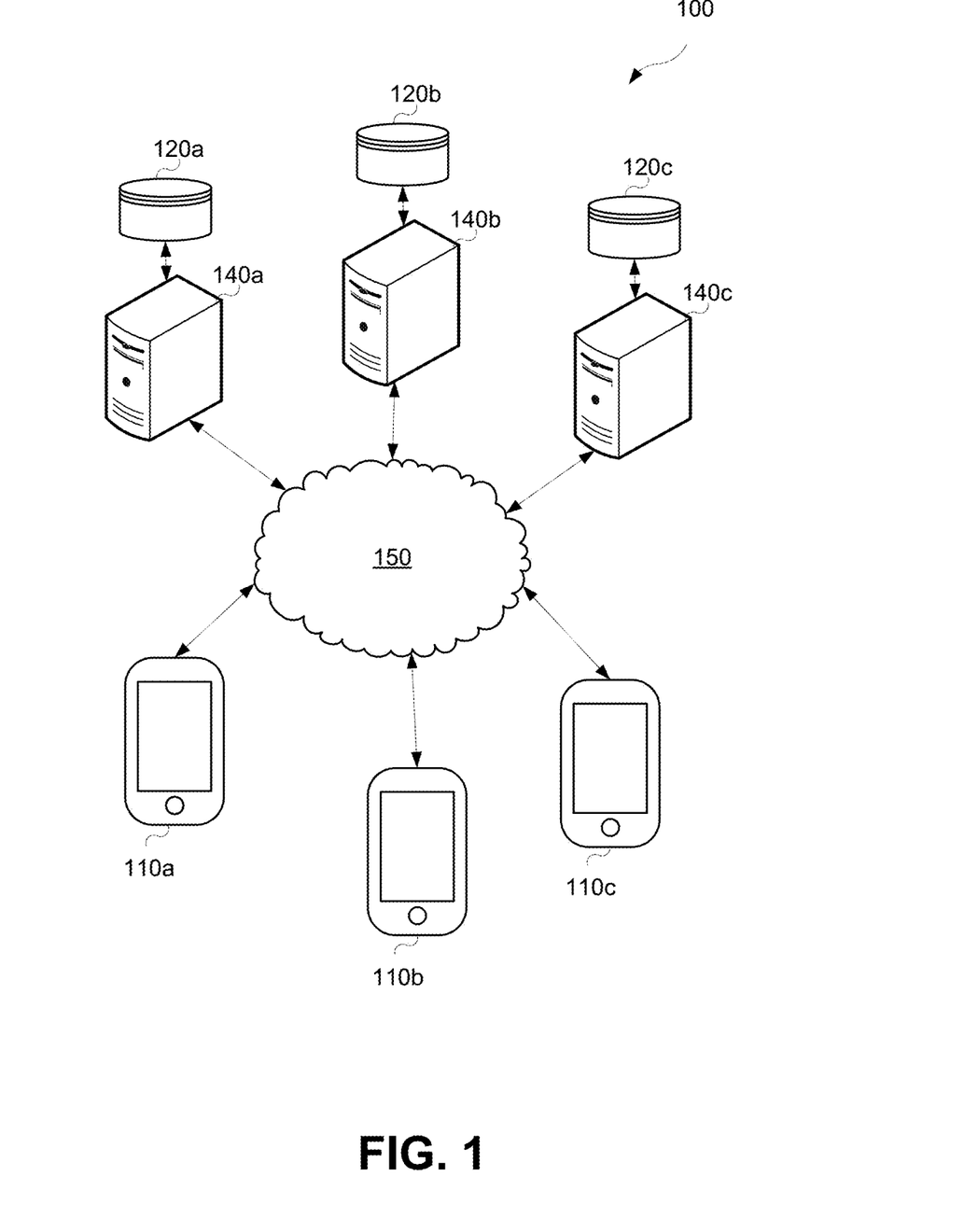
FIG. 1 is a schematic operation diagram illustrating an operating environment of an example embodiment.

FIG. 1 is a block diagram illustrating an operating environment of an example embodiment. Various components cooperate to provide a system 100 which may be used, for example, to perform an operation. As shown, the system 100 includes a plurality of client devices 110a, 110b, 110c and a plurality of database management systems 140a, 140b, 140c. Each database management system 140a, 140b, 140c may be associated with a separate database 120a, 120b, 120c. Each of the database management systems 140a, 140b, 140c may be coupled directly with or integrated with a separate one of the databases 120a, 120b, 120c.

The client devices 110a, 110b, 110c may communicate with one or more of the database management systems 140a, 140b, 140c through the network 150. In at least some implementations, each of the client devices 110a, 110b, 110c is associated with a logical storage area in one or more of the databases 120a, 120b, 120c. Put differently, one or more of the client devices 110a, 110b, 110c may be associated with at least one of the database management systems 140a, 140b, 140c. For example, one or more of client devices 110 may be a computing device that may be associated with an entity, such as a user or client, having a logical storage area in a database 120a, 120b, 120c associated with and/or provided by one of the database management systems 140a, 140b, 140c.

The logical storage area may be a record. A record may be or represent account data. The record may include data of various types and the nature of the data will depend on the nature of the database management system 140a, 140b, 140c. An example record will be described below with reference to FIG. 5.

In some implementations, the database management systems 140a, 140b, 140c may maintain user accounts and a record in the database may be or represent an account. The record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data. For example, in an implementation, one or more of the database management systems 140a, 140b, 140c may track, manage, maintain, and/or provide resources to associated entities. The resources may, for example, be computing resources, such as memory or processor cycles. By way of further example, the resources may include stored value, such as fiat currency, which may be represented in a database. For example, databases 120a, 120b, 120c may be provided in secure storage. The secure storage may be provided internally within the respective database management systems 140a, 140b, 140c or externally. The secure storage may, for example, be provided remotely from the database management systems 140a, 140b, 140c. For example, the secure storage may include one or more data centers. The data centers may, for example, store data with bank-grade security. In some implementations, the database management systems 140a, 140b, 140c may be provided by or associated with respective financial institutions such as banks.

In some instances, the various database management systems 140a, 140b, 140c may communicate with one another. Such communication may be by way of the network 150 or via another means of communication. By way of example, in some implementations, the database management systems 140a, 140b, 140c may exchange messages through a transfer rail server (not shown). The database management systems 140a, 140b, 140c may communicate to, for example, transfer data or other resources from a record in one of the databases 120a, 120b, 120c to a record in another of the databases 120a, 120b, 120c.

The database management systems 140a, 140b, 140c may be operated by different entities. For example, a first database management system 140a may be associated with a first system operator and a second database management system 140b may be associated with a second system operator who is different than the first system operator and a third database management system 140c may be associated with a third system operator who is different than the first and second system operators.

The system operators may, in some implementations, be financial institutions such as banks and the accounts may be or include bank accounts. That is the databases 120a, 120b, 120c may store financial account data. In other implementations, the database management systems 140a, 140b, 140c may manage computing resources such as memory and/or processor cycles which may be used by one or more client devices 110a, 110b, 110c. The records may, for example, associate a particular entity and/or particular client device with particular computer resources. For example, the records may entitle a particular entity exclusive or shared use of a computing resource. The database management systems 140a, 140b, 140c may communicate with one another in order to send and receive messages that transfer use of a computing resource from a record maintained by the one of the database management systems to a record maintained by another of the database management systems.

In another example, the database management systems 140a, 140b, 140c may act as cloud-based storage and may store files, such as documents for various entities. The database management systems may, in accordance with instructions received from an entity associated with a document, transfer that document to another entity having a record at the another database management system. By way of example, the document may be a media file, such as an electronic book, video file or audio file, having digital rights management (DRM) which only permits the document to be transferred if exclusive use of the document is transferred (i.e., if the transfer is performed such that the transferor is no longer able to use the document after the transfer). The database management systems may communicate with one another in order to transfer the document in accordance with instructions received from an associated one of the client devices 110a, 110b, 110c.

The client devices 110a, 110b, 110c may take a variety of forms such as a smartphone, a tablet computer, a wearable computer such as a head-mounted display or smartwatch, a laptop or desktop computer, or a computing device of another type. The database management systems 140a, 140b, 140c are computer systems and computer devices.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

The database management systems 140a, 140b, 140c may be configured to communicate with other servers, such as other database management systems 140a, 140b, 140c using one or more communication protocols, which may also be referred to as transfer protocols or transfer rails.

In at least some embodiments, a transfer rail server (not shown) may be configured to facilitate a transfer from a first data record to a second data record according to a first transfer protocol. The first data record may be a data record maintained by one of the database management systems 140a, 140b, 140c and the second data record may be a data record maintained by a server associated with a different system operator (e.g., such as another of the database management systems 140a, 140b, 140c). The transfer rail server may operate as an intermediary between database management systems. The data records may also be referred to herein as records, accounts or logical storage areas.

One or more of the transfer protocols may not require the use of a transfer rail server. For example, one or more of the transfer protocols may operate through the exchange of messages directly between the database management systems. Such messages may be exchanged through the network 150.

Each of the database management systems 140a, 140b, 140 and each of the client devices 110a, 110b, 110c may be in geographically disparate locations from others of the database management systems 140a, 140b, 140 and client devices 110a, 110b, 110c. Put differently, the database management systems 140a, 140b, 140 and each of the client devices 110a, 110b, 110c may be remote from one another.

FIG. 1 illustrates an example representation of components of the system 100.

The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
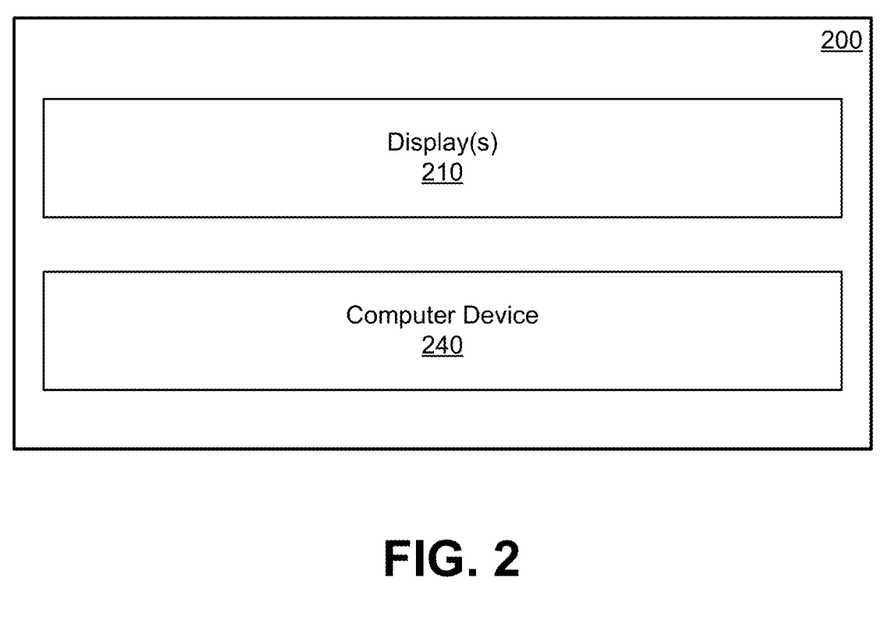
FIG. 2 is a simplified schematic diagram showing components of a computing device.

FIG. 2 is a simplified schematic diagram showing components of an exemplary computing device 200. The client devices 110a, 110b, 110c may be of the same type as computing device 200 or a variation thereof. The computing device 200 may include modules including, as illustrated, for example, one or more displays 210 and a computer device 240.

The one or more displays 210 may be or include a display module. The one or more displays 210 are used to display screens of a graphical user interface that may be used, for example, to communicate with the database management systems 140a, 140b, 140c (FIG. 1). The one or more displays 210 may be internal displays of the computing device 200 (e.g., disposed within a body of the computing device).

The computer device 240 is in communication with the one or more displays 210. The computer device 240 may be or may include a processor which is coupled to the one or more displays 210.

Figure 3:
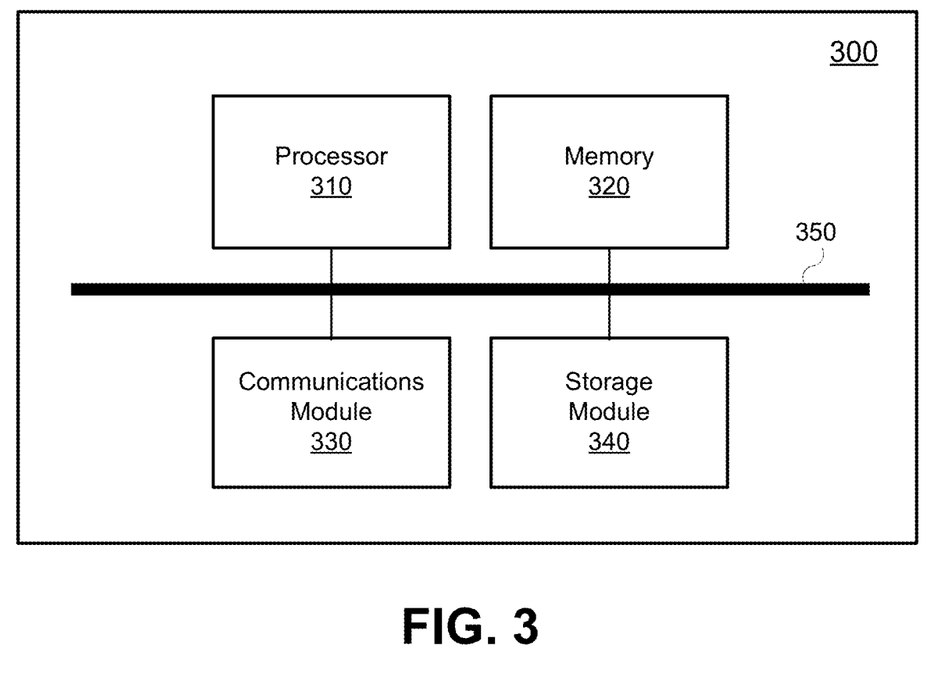
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), one or more of the database management systems 140a, 140b, 140c or one or more of the client devices 110a, 110b, 110c.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computer device 300 functions as one of the database management systems 140a, 140b, 140c of FIG. 1, the storage module 340 may allow the example computing device 300 to access the secure data in an associated database 120a, 120b, 120c (FIG. 1).

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
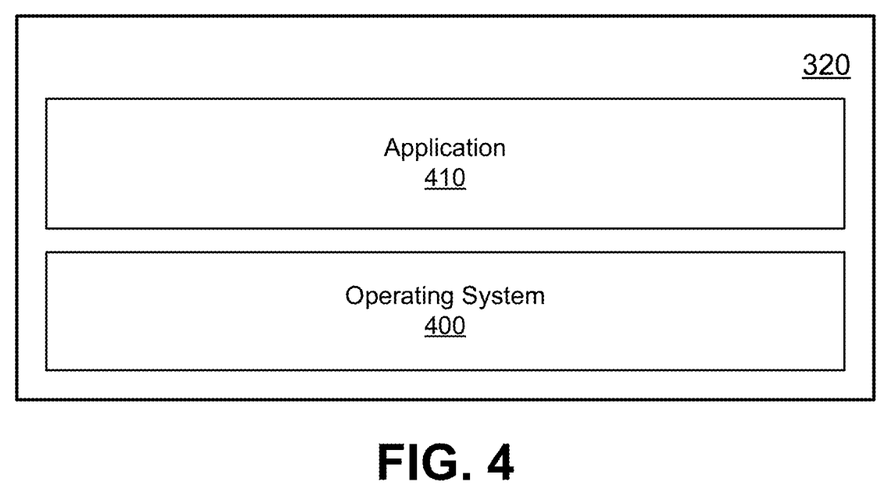
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), one or more of the database management systems 140a, 140b, 140c, one or more of the client devices 110a, 110b, 110c.

While a single application 410 is illustrated in FIG. 3, in operation the memory 320 may include more than one application 410 and different applications 410 may perform different operations. For example, in at least some embodiments in which the computer device 300 is functioning as the client device 110a, 110b, 110c, the applications 410 may include a transfer initiation application or pass-through transfer configuration application. The transfer initiation application or pass-through transfer configuration application may be configured for secure communications with an associated one of the database management systems 140a, 140b, 140c and may provide various functions such as, for example, the ability to display data in a record in an associated database 120a, 120b, 120c. In some implementations, the transfer initiation application or pass-through transfer configuration application may be a banking application which may, for example, be configured to display a quantum of value in one or more data records (e.g., display balances), configure or request that operations such as transfers of value (e.g., bill payments, email money transfers and other transfers) be performed, and perform other account management functions.

By way of further example, in at least some embodiments in which the computer device 300 functions as the client device 110a, 110b, 110c, the applications 410 may include a web browser, which may also be referred to as an Internet browser. In at least some such embodiments, an associated database management system 140a, 140b, 140c may be or include a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g., display balances), configure or request that operations such as transfers of value (e.g., bill payments and other transfers) be performed, and other account management functions.

The transfer initiation application or pass-through transfer configuration application or web browser as the case may be, may be configured to authenticate or to allow an operator of such device to authenticate to one of the database management systems 140a, 140b, 140c. That is, the application may be configured to provide one or more credentials to the database management system 140a, 140b, 140c which allow the database management system 140a, 140b, 140c to identify a record that is associated with the client device 110a, 110b, 110c that provided such credentials. The client device may also provide pass-through transfer definition data to the database management system 140a, 140b, 140c. The pass-through transfer definition data may be used to allow the database management system 140a, 140b, 140c to perform a pass-through transfer as will generally be described below with reference to FIG. 7.

Figure 5:
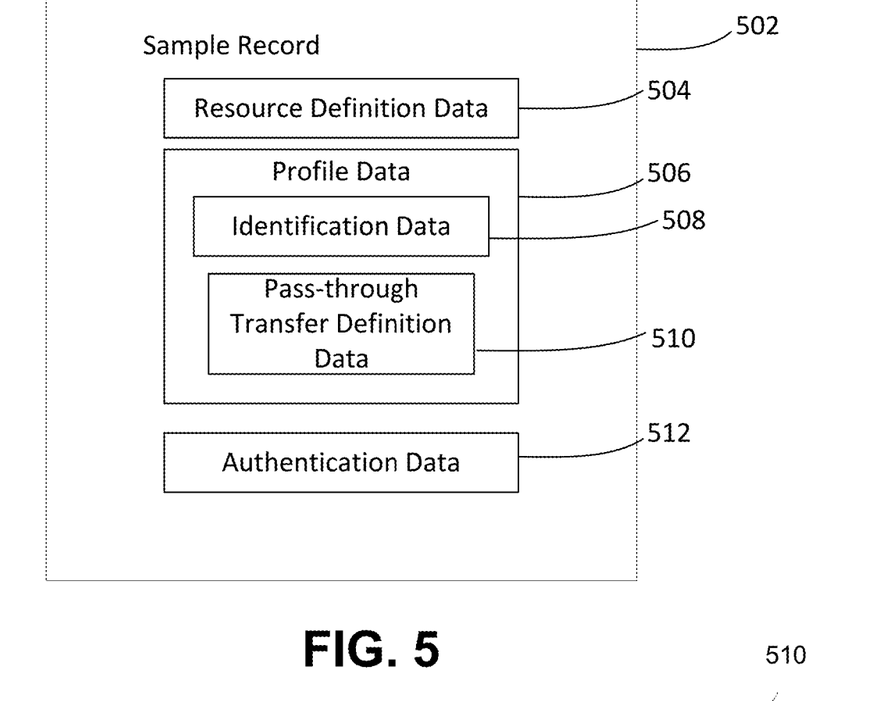
FIG. 5 shows a sample data structure of a record in accordance with example embodiments.

Reference will now be made to FIG. 5 which illustrates an example data structure of a sample record 502. The sample record may represent a logical storage area in one of the databases 120a, 120b, 120c. In the illustrated example, the sample record 502 includes resource definition data 504. The resource definition data 504 may be or represent resources. The resources may be or include one or more of: a computing resource such as processor cycles or memory, a value representing stored value such as monetary value, points such as loyalty points or in-game or in-app points, credits, digital goods, stored documents, or other data. In some instances, the resources may include owned resources (i.e., resources owned by an entity associated with the sample record 502) and/or borrowed resources (i.e., resources that are not owned by the entity associated with the sample record 502 but which are available for use by such entity). In some implementations, the resource definition data 504 may include one or more account balances. The resource definition data may, in some instances be organized according to various account identifiers such as account numbers. By way of example, the resource definition data may include a primary account number (PAN).

The sample record 502 also includes profile data 506. The profile data 506 may include, for example, identification data 508 which identifies an entity that is associated with the sample record 502. The identification data 508 may include know your client (KYC) data. For example, the identification data 508 may include any one or a combination of: a name, an address, a telephone number, an email address, a date of birth, an identification number such as a driver's license number or social insurance number, etc.

The profile data 506 may include pass-through transfer definition data 510. The pass-through transfer definition data 510 may be used by a computer system, such as an associated database management system 140*a*, 140*b*, 140*c*, to perform a partial pass-through transfer when an incoming transfer satisfying certain criteria is received. Example pass-through transfer definition data 510 will be described below with reference to FIG. 6.

The sample record 502 may also include authentication data 512. The authentication data 512 may include one or more credential that may be used to authenticate a client device 110*a*, 110*b*, 110*c* as being associated with the sample record 502. The credential may be or include an identifier such as a username, primary account number (PAN), or another identifier that is unique to entity that is associated with the sample record 502. The credential may include a password or biometric data such as an indicator of a fingerprint. In some instances, the authentication data 512 includes one or more tokens. The token may be used to allow a device, such as a client device 110*a*, 110*b*, 110*c* to authenticate to the database management system.

The sample record 502 may include other data instead of or in addition to the data illustrated in FIG. 5.

Figure 6:
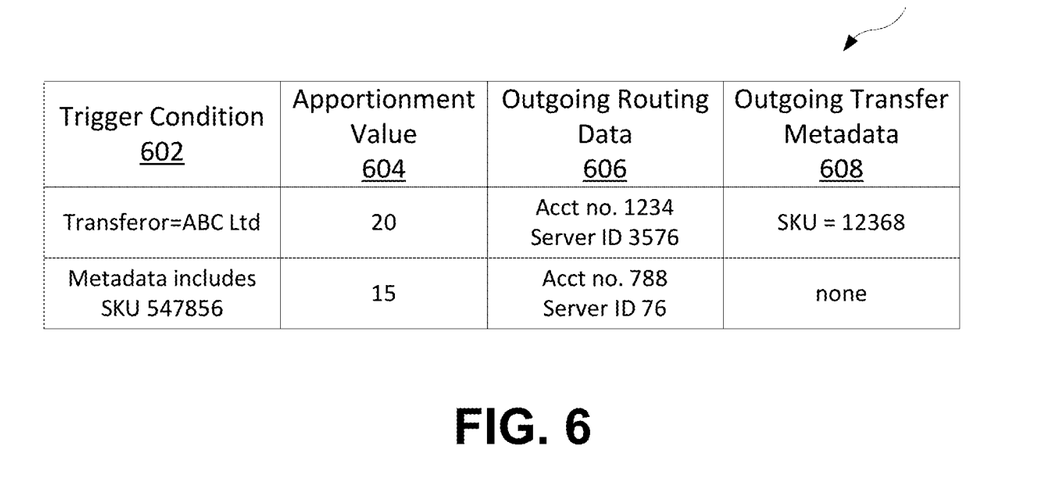
FIG. 6 shows example pass-through transfer definition data according to an embodiment.

Reference will now be made to FIG. 6 which illustrates example pass-through transfer definition data 510. The pass-through transfer definition data 510 may be defined by an entity that is associated with a particular logical storage area, such as a particular record. For example, the pass-through transfer definition data 510 may be received from a client device 110*a*, 110*b*, 110*c* that has authenticated to the database management system 140*a*, 140*b*, 140*c* as being associated with the particular record. That is, the pass-through transfer definition data 510 may be defined by a client device 110*a*, 110*b*, 110*c* after the client device has established to the database management system 140*a*, 140*b*, 140*c* that it is being operated by the entity that is associated with the particular record. Such authentication may rely upon the authentication data 512.

The pass-through transfer definition data 510 may define a processing routine for incoming transfers satisfying certain criteria. Such criteria may be referred to as a trigger condition 602. The trigger condition 602 defines when a particular pass-through transfer routine is to be triggered. In the example illustrated, each line below the top line represents a separate pass-through transfer routine. Each of these routines has a separate trigger condition 602. The first pass-through transfer routine is, in the illustrated example, a trigger condition that is based on a transferor identifier. More specifically, the first of the pass-through transfer routines is triggered when a transferor identifier in a received transfer (also referred to herein as an incoming transfer) satisfies predetermined criteria. By way of example, if a transfer that is received at the database management system for storage in the record includes a transferor identifier that matches the transferor identifier specified in the trigger condition (in the example "ABC Ltd"), then the pass-through transfer routine is determined to be triggered and a further transfer is then performed in accordance with other parameters specified in the pass-through transfer definition data 510. In the illustrated example, the second of the pass-through transfer routines is triggered when metadata in a received transfer into an account associated with the record satisfies specified criteria. In the illustrated example, this criteria is satisfied when a stock keeping unit (SKU) identifier in metadata of the transfer satisfies specified criteria (e.g., when it includes "547856). A trigger condition may include a field or parameter identifier that informs the database management system of a field or location in a transfer that is to be evaluated (e.g., "Transferor", "SKU", etc.) and a value that is to be identified in such a field/parameter (e.g., ABC Ltd or 547856 in the example) for the trigger condition to be said to have occurred.

In the example, the trigger conditions are based on a transferor identifier and a SKU but other triggers are contemplated. For example, a trigger condition may be based on a date (e.g., it is only triggered if the transfer is received on a particular date or range of dates) or it may be based on a subject of the transfer. For example, a trigger condition may be defined to be triggered only when the transfer is for an amount that is within a particular range, or above a defined threshold or below a defined threshold.

Further, the trigger condition may be based on multiple criteria. For example, a trigger condition could be defined such that it occurs only when two or more criteria are satisfied for an incoming transfer. For example, a trigger condition may be: Transferor=ABC Ltd AND Metadata includes SKU 547856. In this way, the pass-through transfer routine is only triggered if the incoming transfer satisfies both criteria (e.g., if it is from ABC Ltd and references SKU 547856). The trigger conditions may support other Boolean operations apart from an AND operation. For example, a trigger condition may include a Boolean OR operation where the trigger condition may be said to occur when either one or another of the criteria occurs. By way of further example, a NOT Boolean operation may be included in a trigger condition.

The pass-through transfer definition data 510 may also include a routine that is to be executed when the trigger condition 602 is satisfied by an incoming transfer. The routine may include apportionment data such as an apportionment value 604. The routine may also include outgoing routing data 606. In some implementations, the routine may also include outgoing transfer metadata 608.

The apportionment data such as the apportionment value 604 defines an amount of a received transfer that is to be passed through to another logical storage area, such as another account or record. The outgoing routing data 606 defines routing information that may be used to route the portion of the transfer that is to be passed through. The outgoing routing data 606 may be or include a record identifier such as an account number. The record identifier may be unique to a particular one of the database management systems 140*a*, 140*b*, 140*c* and/or databases 120*a*, 120*b*, 120*c*. The outgoing routing data 606 may also include a database identifier. The database identifier identifies which of the database management systems 140*a*, 140*b*, 140*c* manages the record defined by the record identifier. The database identifier may be an institution identifier in some implementations.

The outgoing transfer metadata 608 defines data that is to be automatically included in the pass-through transfer (i.e., in the outgoing transfer that is sent when an incoming transfer satisfies the trigger condition). The outgoing transfer metadata 608 may define a field or parameter identifier that informs the database management system of a field or location in an outgoing transfer that is to be affected (e.g., "Transferor", "SKU", etc.) and a value that is to be inserted into such a field/location. The outgoing transfer metadata 608 may be used to allow the database management system receiving the pass-through transfer to evaluate the received transfer against other pass-through transfer definition data defined for a logical storage location, such as an account, specified in the outgoing routing data 606.

Figure 7:
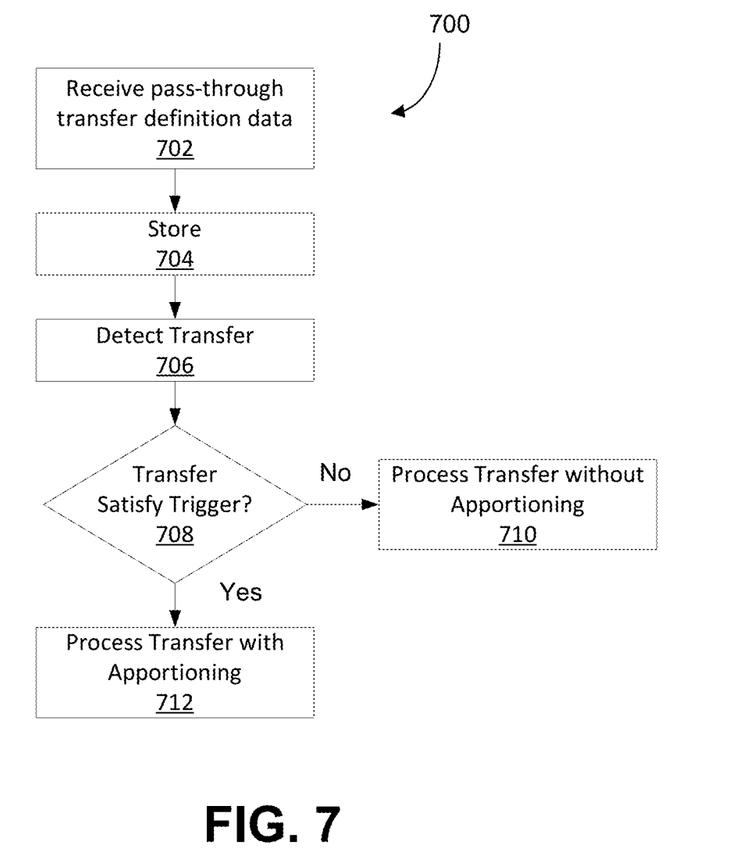
FIG. 7 is a flowchart showing operations of a method of performing a partial pass-through data transfer according to an embodiment.

Reference will now be made to FIG. 7, which is a flowchart showing operations performed by a computer system. For example, the operations may be performed by a database management system 140a, 140b, 140c. The operations may, for example, be performed by a processor. For example, a memory may be coupled to the processor and may store instructions that, when executed, configure the processor to perform the operations or a portion or variation thereof. Accordingly, a computer-readable storage medium such as a non-transitory computer readable storage medium may store instructions which, when executed, configure a processor to perform the operations or a portion of variation thereof. The operations of FIG. 7 or a variation or portion thereof may be included in a method 700. The method 700 may be performed by a computer system such as a first one of the database management systems 140a, 140b, 140c.

At operation 702, the database management system 140a, 140b, 140c may receive, from a first computing system and via the communications module, pass-through transfer definition data 510. The first computing system may be a client device 110a, 110b, 110c of the type described above. For example, the first computing system may be associated with a customer or other entity having a record that is managed by the database management system performing the operation 702.

The received pass-through transfer definition data 510 is data that is intended to be associated with a first logical storage area. For example, the first computing system may authenticate to the database management system performing the operation 702. Such authentication may be performed prior to the operation 702 so that operation 702 is performed while the first computing device is engaging in an authentication session with the database management system performing the operation 702.

Authentication may be performed based on data received from the first computing system such as the client device 110a, 110b, 110c. For example, such data may be compared with authentication data 512 (FIG. 5) stored in association with a particular account such as a particular record in a database 120a, 120b, 120c. In this way, the database management system performing the method 700 authenticates the first computing system (such as the client device 110a, 110b, 110c) as being associated with a particular logical storage area in the database 120a, 120b, 120c managed by that database management system. The received pass-through transfer data is intended to be associated with this particular logical storage area, which may be referred to as a first logical storage area.

The pass-through transfer definition data 510 may be as described above; for example, with reference to FIG. 6. For example, the pass-through transfer definition data 510 may include a trigger condition for a pass-through transfer. The pass-through transfer definition data 510 may also include an apportionment value for the pass-through transfer. The apportionment value defines how a future incoming transfer is to be apportioned. The apportionment value may define how the apportionment is to occur in relative terms or in absolute terms. Relative terms may include, for example, a value indicating a percentage that is to be apportioned. By way of example, the value may be 20% so that 20% of a received transfer may be passed through and 80% of the received transfer is not passed through. Absolute terms may include, for example, a dollar value. For example, for each received transfer, the apportionment value may specify that a certain dollar amount is passed through, irrespective of the amount of the received transfer. Accordingly, in at least some implementations, when the apportionment data is defined in relative terms, the database management system may determine a value for an outgoing transfer based on a value of an incoming transfer while, when the apportionment data is defined in absolute terms, the value for the outgoing transfer is not based on the value of the incoming transfer.

The pass-through transfer definition data 510 may include outgoing routing data 606. The outgoing routing data may be as described above with reference to FIG. 6. In some implementations, the pass-through transfer definition data 510 may include outgoing transfer metadata 608. The outgoing transfer metadata 608 may be of the type described above with reference to FIG. 6. The outgoing transfer metadata 608 may be or include an identifier. The identifier may, in some implementations, uniquely identify an entity that is associated with the first logical storage area in a system that is associated with an entity that is associated with a second logical storage area, which will receive a pass-through portion of a transfer. For example, the identifier may be an account number, customer number or other identifier that is used to inform a recipient of the pass through transfer about where the transfer originated from.

Other outgoing transfer metadata 608 may be stored apart from an identifier of an entity. For example, as illustrated in FIG. 6, a product identifier such as a SKU may be included.

The pass-through transfer definition data may be received via a user interface displayed or otherwise provided on the first computing system. The user interface may be displayed in a pass-through transfer configuration application or another suitable application on the first computing system. In some instances, the database management system or another related system may serve the user interface or serve data that is used to generate the interface on the first computing system.

Next, at an operation 704, the pass-through transfer definition data is stored in association with the first logical storage area. That is, the pass-through transfer definition data is stored so as to be associated with an authenticated entity. For example, the pass-through transfer definition data may be stored in a record or other logical storage area as illustrated in FIG. 5.

After the pass-through transfer definition data 510 is stored in association with the first logical storage area, it may be used to process incoming transfers that are directed to the first logical storage area. For example, at operation 706, the database management system 140a, 140b, 140c performing the method 700 detects a first data transfer to the first logical storage area. That is, the database management system detects an incoming transfer for the first logical storage area. The first data transfer may be or represent a transfer of a resource and may be referred to as a transfer herein. The resource may be of the type generally described above. The data transfer may be received at the database management system 140a, 140b, 140c from another database management system 140a, 140b, 140c. In some implementations, the transfer may be received via an intermediary transfer rail server. In some implementations, the first data transfer may be a real time transfer. That is, it may settle in real time rather than requiring settlement at a later time such as during a batch process at an end of day period.

The first data transfer may have been initiated based on a transfer instruction provided on one of the client devices 110a, 110b, 110c. That is, the first data transfer may have been initiated at the request of an entity that provided an instruction through a client device that has authenticated to an associated database management system 140a, 140b, 140c.

At operation 708, the database management system 140a, 140b, 140c may evaluate whether the first data transfer satisfies a trigger condition 602 defined in the pass-through transfer definition data 510. In some instances, the first data transfer may include metadata. Determining whether the first data transfer satisfies the trigger condition may be performed based on the metadata. For example, the metadata may include a product identifier and the database management system 140a, 140b, 140c may determine that the first data transfer satisfies the trigger condition based on the product identifier. The product identifier may be a SKU, for example.

In some instances, the trigger condition may specify a transferor identifier and the determination of whether the first data transfer satisfies the trigger condition may be based on the transferor identifier.

Other types of trigger conditions are contemplated.

As noted above in the discussion of FIG. 6, the trigger conditions may be based on multiple criteria and evaluating the trigger conditions may include performing a Boolean analysis on multiple criteria.

As illustrated in FIG. 7, if at the operation 708, the database management system 140a, 140b, 140c determines that the incoming transfer does not satisfy the trigger condition, then it may, at an operation 710, process the transfer without apportioning. For example, it may store the data or other resource that is transferred in the detected transfer in the first logical storage area without passing any of that data or resource onto another logical storage area.

If, however, at operation 710, the database management system 140a, 140b, 140c determines that the incoming transfer satisfies the trigger condition, then the database management system 140a, 140b, 140c may, at operation 712, process the transfer with apportioning.

At operation 712, the database management system 140a, 140b, 140c may identify a portion of the resource represented in the first data transfer. The portion may be identified based on the apportionment value. By way of example, in some implementations in which the apportionment value is specified in relative terms, such as a percentage, the portion may be identified by applying the apportionment value to the amount of the resource in the first data transfer. If, however, the apportionment value is specified in absolute terms, the portion may be identified from the apportionment value alone. For example, the apportionment value may be a dollar value (e.g., $5) and that dollar value may automatically be used as the identified portion.

At the operation 712, the database management system 140a, 140b, 140c may also initiate a data transfer, which may be referred to as a second data transfer or pass-through transfer to distinguish from the data transfer at operation 706. The second data transfer is a transfer of a portion of the resources included in the first data transfer received at the operation 706. That is, some of the resources that were included in the first data transfer are not passed through in the second data transfer. Some of the resources are stored or remain stored in the first logical storage area.

The second data transfer transfers the identified portion of the resource to a second logical storage area. That is, the second data transfer transfers the identified portion (i.e. the portion that is to be passed through) to another logical storage area such as to another record. The second logical storage area may be located in a different one of the databases 120a, 120b, 120c than the first logical storage area. Put differently, the second logical storage area and the first logical storage area may be managed by different database management systems 140a, 140b, 140c.

In preparing the second data transfer, the database management system 140a, 140b, 140c may also retrieve and utilize the outgoing routing data 606 in the pass-through transfer routine that has been triggered. Such data may be used for routing purposes. For example, the outgoing routing data 606 may be used by the database management system 140a, 140b, 140c to determine where the second data transfer is to be routed. The second data transfer may be routed to a second logical storage area identified in the outgoing routing data 606.

In preparing the second data transfer, the database management system 140a, 140b, 140c may also retrieve and utilize outgoing transfer metadata 608 defined for the pass-through transfer routine in the pass-through transfer definition data 510. For example, the pass-through transfer definition data may include an identifier and the database management system 140a, 140b, 140c may retrieve this identifier and include the identifier as metadata in the pass-through transfer (i.e., in the second data transfer). The identifier may be or include a transferor identifier which identifies an entity associated with the first logical storage area or a product identifier. Other metadata may be defined in the outgoing transfer metadata 608 instead of or in addition to the identifier and may be included in the second data transfer. The metadata such as the identifier may be included in the second data transfer to allow a database management system 140a, 140b, 140c that receives the second data transfer on behalf of its recipient to evaluate whether a trigger condition for a further pass-through transfer is to be performed. For example, the database management system 140a, 140b, 140c may be configured to itself perform the method 700 of FIG. 7 to allow for pass-through transfers and the metadata may be included to allow the database management system 140a, 140b, 140c to determine whether a pass-through transfer is to be performed in accordance with pass-through transfer definition data defined for the second logical storage area.

In some implementations, the pass-through transfer definition data 510 may include outgoing transfer metadata 608 that specifies that all or a portion of the metadata in the first data transfer is to be included in the second data transfer. For example, if the first data transfer includes a SKU, that SKU may be included in the second data transfer.

The second data transfer may be sent from the database management system 140a, 140b, 140c to another database management system 140a, 140b, 140c. In some implementations, the second data transfer may be sent via an intermediary transfer rail server. In some implementations, the second data transfer may be a real time transfer. That is, it may settle in real time rather than requiring settlement at a later time such as during a batch process at an end of day period. For example, the second data transfer may be transferred over a real time transfer rail. In this way, the second logical storage area may receive the identified portion of the first data transfer in real time after the first data transfer is detected. As noted above, the first data transfer may also be a real time transfer and so the second transfer may be completed in real time when the first data transfer is sent. Real time as used herein is intended to refer to completion in 10 seconds or less.

The pass-through transfer routines described herein may be utilized in many applications. By way of example, in one implementation, the transfers may be transfers between banks and the second data transfer/passed-through transfer may represent a royalty payment or other payment type. In one implementation, the second data transfer may be a transfer to a logical storage area associated with a manufacturer or distributor of a good that is sold by an entity associated with the first logical storage area, who may be referred to as a merchant. The second data transfer may be triggered when the first data transfer represents a transfer on account of a good sold by the merchant and manufactured or distributed by the manufacturer or distributor associated with the second logical storage area. In this way, a remittance to a manufacturer or distributor may be made in real time when a good is sold by a merchant who receives the good from the manufacturer or distributor. Other parties may receive pass-through transfers apart from manufacturers or distributors. For example, a recipient may be or represent an author or inventor, or a manufacturer or raw materials producer who provided an input for a good that was sold and paid for by the first data transfer.

The pass-through transfer may be performed automatically and directly without requiring any interaction from a user. In this way, the pass-through may occur instantly.

In some implementations, it may be necessary or desirable to reverse a data transfer that has already been passed through. An example method 800 for reversing a pass-through transfer will now be described with reference to FIG. 8.

Figure 8:
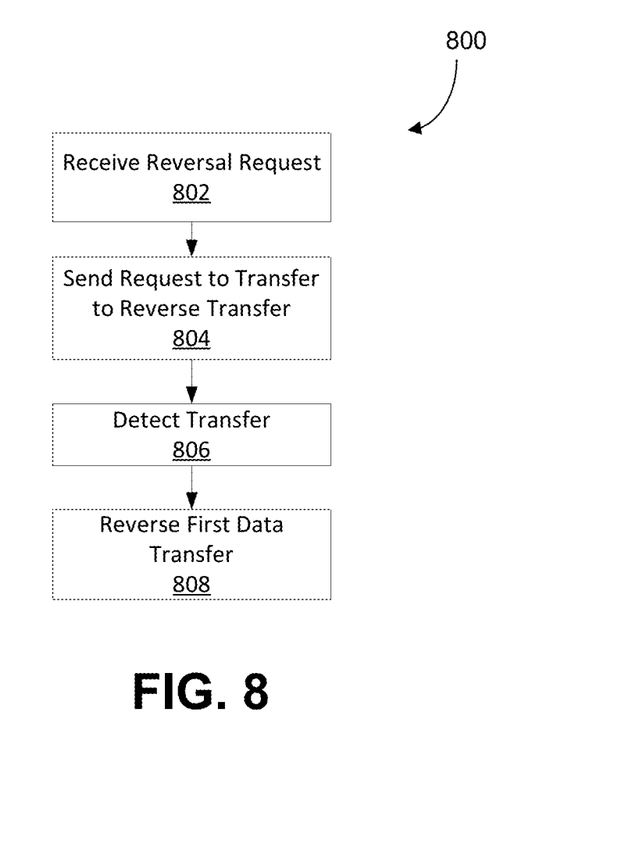
FIG. 8 is a flowchart showing operations of a method of reversing a partial pass-through data transfer according to an embodiment.

FIG. 8 is a flowchart showing operations performed by a computer system. For example, the operations may be performed by a database management system 140a, 140b, 140c. The operations may, for example, be performed by a processor. For example, a memory may be coupled to the processor and may store instructions that, when executed, configure the processor to perform the operations or a portion or variation thereof. Accordingly, a computer-readable storage medium such as a non-transitory computer readable storage medium may store instructions which, when executed, configure a processor to perform the operations or a portion of variation thereof. The operations of FIG. 8 or a variation or portion thereof may be included in a method 800. The method 800 may be performed by a computer system such as a first one of the database management systems 140a, 140b, 140c. The operations of FIG. 8 may be performed after the operations of FIG. 7.

At operation 802, the method 800 includes receiving a reversal request for reversing the first data transfer. The reversal request may be received from the database management system that sent the first data transfer received at operation 706 of the method 700. The reversal request may, in some implementations, be a refund request. The refund request may, for example, be a request to transfer.

A request to transfer may be a specially formatted message that is sent from a first database management system to a second database management system. The request to transfer may be sent from a first database management system to a second database management system over a transfer rail that is used for facilitating transfers between databases associated with different database management systems.

A request to transfer is a message that is sent on behalf of a recipient to initiate a transfer from a sender to the recipient. That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

The request to transfer message is specially formatted to include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

The parameters that are included in the request to transfer may include data of another type. For example, in some implementations, the parameters may be or include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the database management systems may be a financial institution systems. In at least some such implementations, the records may represent bank accounts and a transfer may be a request to transfer value from a sender bank account to the recipient bank account. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the database management system that receives it. For example, the database management system that receives the request to transfer message may be configured to execute a process for obtaining authorization to complete a transfer in response to receiving the request to transfer. More particularly, the database management systems may be configured to only permit authorized transfers. For example, in one implementation, the database stores account data for a plurality of accounts and a database management system will only allow a transfer out of an account if the transfer is authorized by an authorization entity for that account, such as an accountholder. Authorization may, for example, require authenticated approval using a credential such as one or more of a username, password, biometric authentication data or other credential.

In one implementation, in response to receiving the transfer message, a database management system may identify an affected account/logical storage area using an identifier defined by the transfer message. Then, the database management system may send an electronic notification to a client device associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the sender rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the sender define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, transfer scheduling data included in the request to transfer message may be used to schedule the transfer without requiring the sender to define such a schedule. For example, where the transfer scheduling data is a due date or deadline, the database management system associated with the sender may automatically define a time for a transfer based on the transfer scheduling data without requiring the sender to input such a time.

In this way, the recipient may cause a database management system that is associated with the sender's record in a database to perform the transfer without having to input any parameters for the transfer. The time and/or amount of the transfer may be extracted directly from the request to transfer message. The sender may only need to input an indication of consent to initiate the transfer when the sender has authenticated to the database management system and the transfer may then be performed.

In response to receiving the reversal request, the database management system 140a, 140b, 140c may attempt to reverse the pass-through transfer performed at the operation 712 of the method 700. In at least some implementations, the reversal may be performed using a request to transfer operation. For example, in response to receiving the reversal request, the database management system may send (at operation 804) a request to transfer to the second logical storage area. For example, the database management system may send the request to transfer to a database management system that manages the second logical storage area. Put differently, the reversal request may be sent to the same database management system to which the pass-through transfer was sent at the operation 712 of the method 700 of FIG. 7.

In the method 800, the request to transfer may be pre-populated with one or more parameters that reverse the pass-through data transfer. For example, the request to transfer may be pre-populated to transfer a defined amount of resources from the second logical storage area to the first logical storage area and the defined amount may be based on an amount of the pass-through transfer performed at the operation 712.

The database management system performing the method 800 detects, at the operation 806, a third data transfer. The third data transfer is a completion of the request to transfer. That is, the third data transfer is a transfer that is performed to transfer the defined amount of resources back from the second logical storage location to the first to reverse the pass-through transfer that was performed at operation 712.

Then, in response to detecting the third data transfer, the database management system initiates a fourth data transfer at an operation 808. The fourth data transfer reverses the first data transfer that was received at the operation 706.

The resource transfers described herein may be performed on resources that are copy-protected resources. For example, the resource may be any resource that for which a computer that manages that resource is configured to prevent the duplication of the resource. That is, the computer prevents the resource from being copied but it permits the resource to be transferred. In some implementations, the computer may be configured with digital rights management (DRM) which enforces a copying restriction on the resource. The copying restriction may allow a transfer of the resource but may prevent a duplication of the resource. For example, the computer may permit a transfer of a resource or a part thereof from a source to a destination as long as the resource or part being transferred is removed from the source so that no duplication occurs.

The resource may be of a variety of types. By way of example, in some implementations, the resources may be or include content, such as video content, audio content, an electronic book, etc. In some implementations, the resource may represent a store of value, such as money, cryptocurrency, etc.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computer system comprising:
a processor;
a communications module coupled to the processor; and
a memory coupled to the processor, the memory storing instructions that, when executed, configure the processor to:
receive, from a first computing system and via the communications module, pass-through transfer definition data to be associated with a first logical storage area, the pass-through transfer definition data including a trigger condition for a pass-through transfer and an apportionment value for the pass-through transfer;
  store a representation of the pass-through transfer definition data in association with the first logical storage area;
  detect a first data transfer to the first logical storage area, the first data transfer representing a transfer of a resource;
  determine that the first data transfer satisfies the trigger condition; and
  in response to determining that the first data transfer satisfies the trigger condition, perform the pass-through transfer by:
    identifying a portion of the resource based on the apportionment value; and
    initiating the pass-through transfer, the pass-through transfer transferring the identified portion of the resource to a second logical storage area.

2. The computer system of claim 1, wherein the instructions further configure the processor to:
  receive a reversal request for reversing the first data transfer;
  in response to receiving the reversal request, send a request to transfer to the second logical storage area, the request to transfer configured to reverse the pass-through transfer by sending a third data transfer from the second logical storage area to the first logical storage area; and
  detect the third data transfer; and
  in response to detecting the third data transfer, initiate a fourth data transfer, the fourth data transfer reversing the first data transfer.

3. The computer system of claim 1, wherein the first data transfer includes metadata, and wherein determining that the first data transfer satisfies the trigger condition includes determining that the first data transfer satisfies the trigger condition based on the metadata.

4. The computer system of claim 3, wherein the metadata includes a product identifier and wherein determining that the first data transfer satisfies the trigger condition based on the metadata includes determining that the first data transfer satisfies the trigger condition based on the product identifier.

5. The computer system of claim 1, wherein the pass-through data transfer includes metadata for evaluating whether a second trigger condition for a further pass-through transfer is to be performed.

6. The computer system of claim 1, wherein the pass-through data transfer is transferred over a real time transfer rail such that the second logical storage area receives the identified portion in real time after the first data transfer is detected.

7. The computer system of claim 1, wherein the apportionment value defines how a transfer of resources is to be apportioned in relative terms.

8. The computer system of claim 1, wherein the apportionment value defines how a transfer of resources is to be apportioned in absolute terms.

9. The computer system of claim 1, wherein the pass-through transfer definition data includes an identifier, and wherein initiating the pass-through transfer includes:
  retrieving the identifier and including the identifier as metadata in the pass-through transfer.

10. The computer system of claim 9, wherein the identifier uniquely identifies an entity that is associated with the first logical storage area in a system that is associated with an entity that is associated with the second logical storage area.

11. A computer-implemented method, comprising:
  receiving, from a first computing system, pass-through transfer definition data to be associated with a first logical storage area, the pass-through transfer definition data including a trigger condition for a pass-through transfer and an apportionment value for the pass-through transfer;
  storing a representation of the pass-through transfer definition data in association with the first logical storage area;
  detecting a first data transfer to the first logical storage area, the first data transfer representing a transfer of a resource;
  determining that the first data transfer satisfies the trigger condition; and
  in response to determining that the first data transfer satisfies the trigger condition, perform the pass-through transfer by:
    identifying a portion of the resource based on the apportionment value; and
    initiating the pass-through transfer, the pass-through transfer transferring the identified portion of the resource to a second logical storage area.

12. The method of claim 11, further comprising:
  receiving a reversal request for reversing the first data transfer;
  in response to receiving the reversal request, sending a request to transfer to the second logical storage area, the request to transfer configured to reverse the pass-through transfer by sending a third data transfer from the second logical storage area to the first logical storage area; and
  detecting the third data transfer; and
  in response to detecting the third data transfer, initiating a fourth data transfer, the fourth data transfer reversing the first data transfer.

13. The method of claim 11, wherein the first data transfer includes metadata, and wherein determining that the first data transfer satisfies the trigger condition includes determining that the first data transfer satisfies the trigger condition based on the metadata.

14. The method of claim 13, wherein the metadata includes a product identifier and wherein determining that the first data transfer satisfies the trigger condition based on the metadata includes determining that the first data transfer satisfies the trigger condition based on the product identifier.

15. The method of claim 11, wherein the pass-through transfer includes metadata for evaluating whether a second trigger condition for a further pass-through transfer is to be performed.

16. The method of claim 11, wherein the pass-through transfer is transferred over a real time transfer rail such that the second logical storage area receives the identified portion in real time after the first data transfer is detected.

17. The method of claim 11, wherein the apportionment value defines how a transfer of resources is to be apportioned in relative terms.

18. The method of claim 11, wherein the apportionment value defines how a transfer of resources is to be apportioned in absolute terms.

19. The method of claim 11, wherein the pass-through transfer definition data includes an identifier, and wherein initiating the pass-through transfer includes:
  retrieving the identifier and including the identifier as metadata in the pass-through transfer.

20. The method of claim 19, wherein the identifier uniquely identifies an entity that is associated with the first logical storage area in a system that is associated with an entity that is associated with the second logical storage area.

* * * * *